A. N. ADAMS.
GEARING.
APPLICATION FILED DEC. 28, 1908.
926,919.
Patented July 6, 1909.
3 SHEETS—SHEET 1.
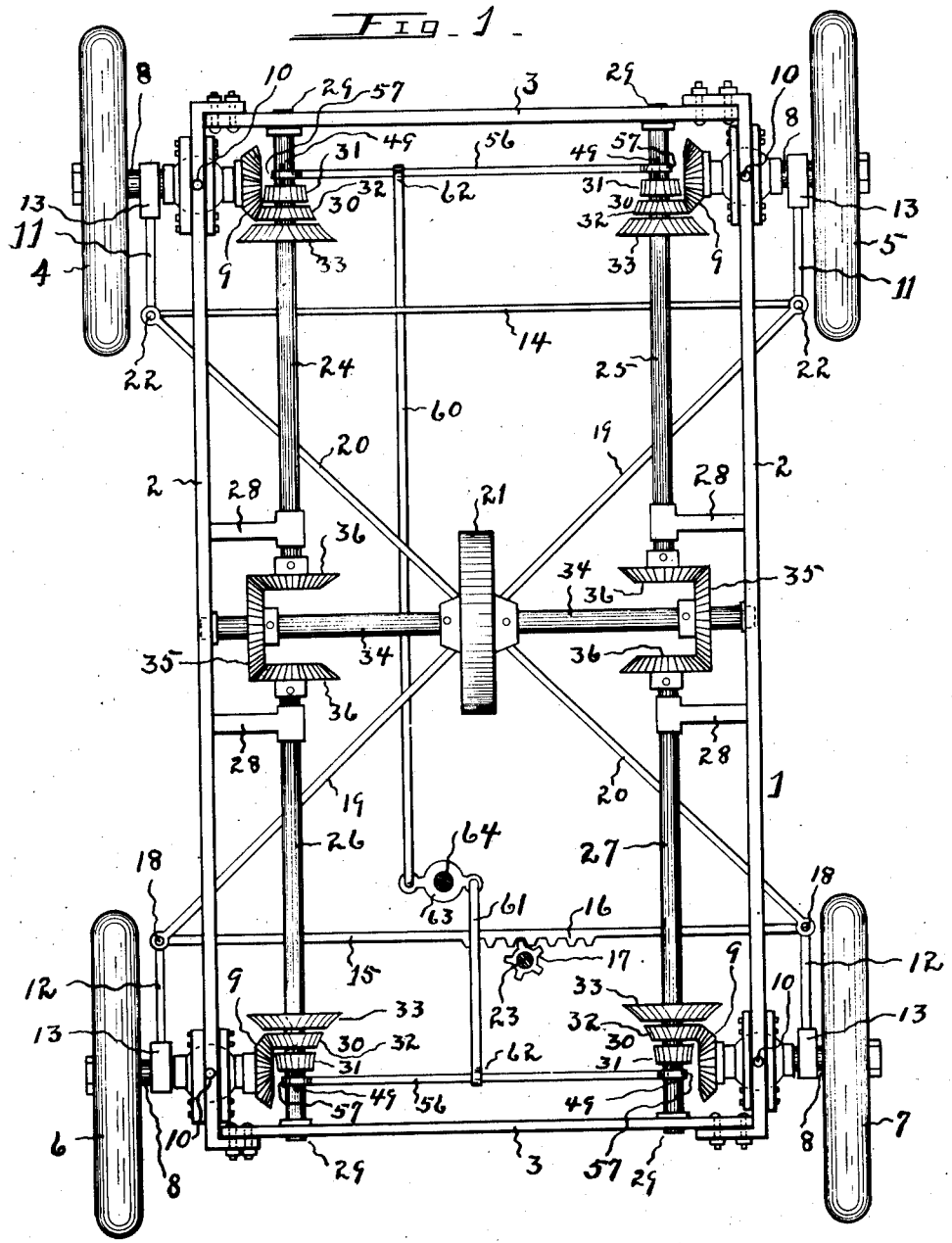

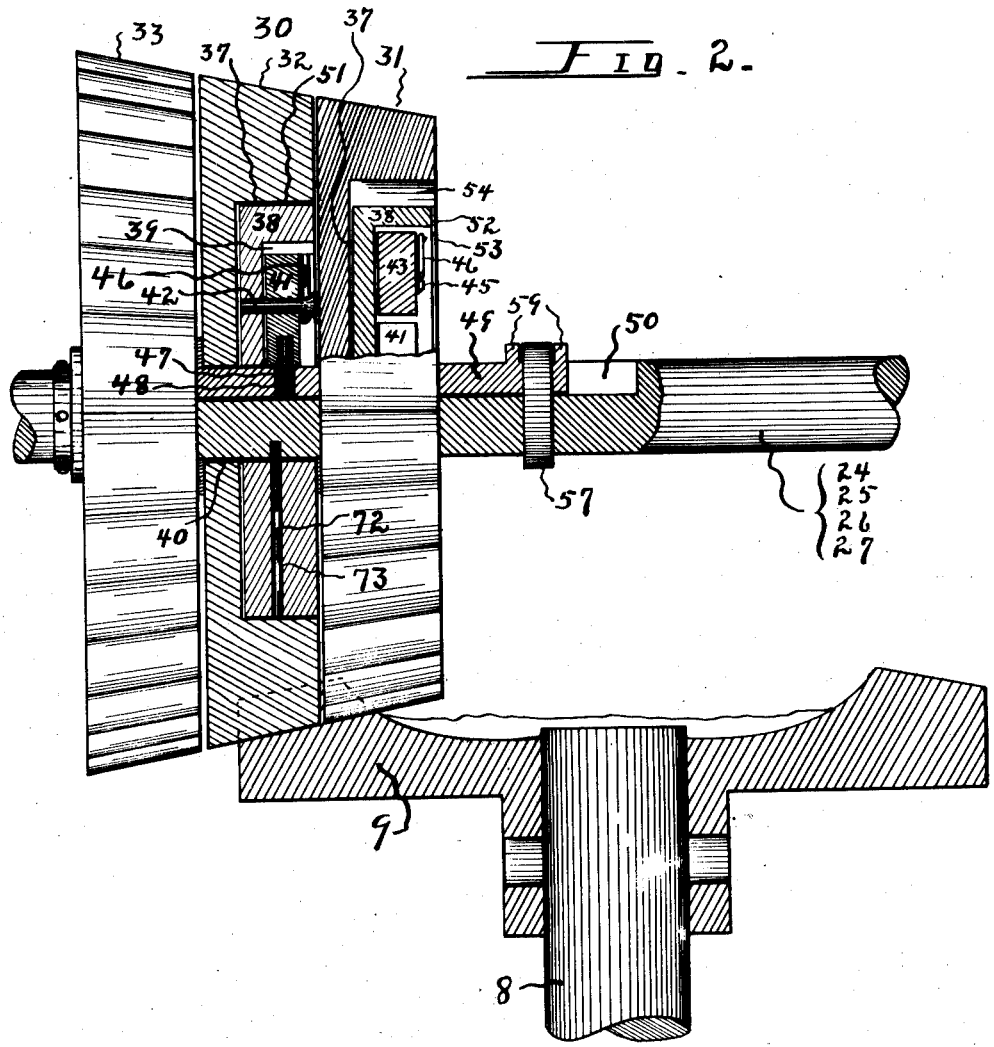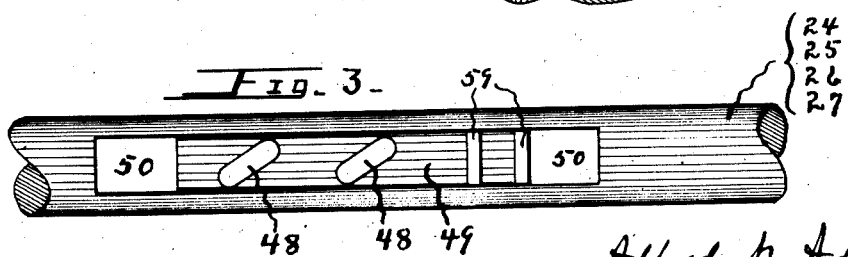

A. N. ADAMS.
GEARING.
APPLICATION FILED DEC. 28, 1908.
926,919.
Patented July 6, 1909.
3 SHEETS—SHEET 3.
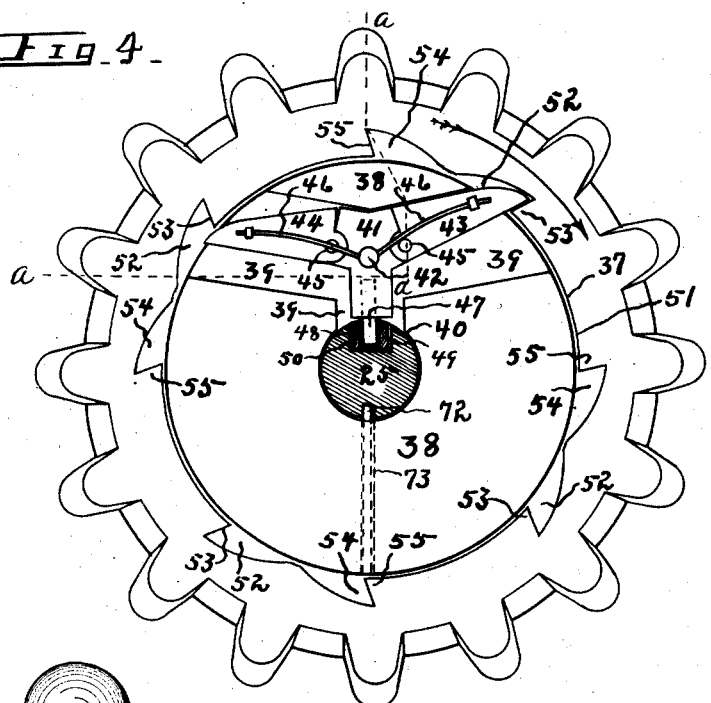
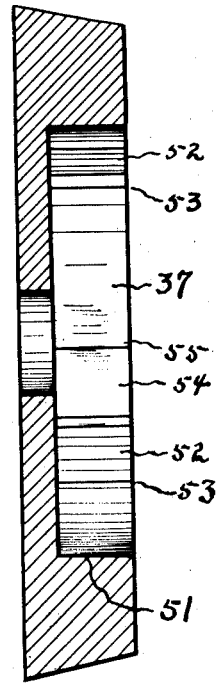
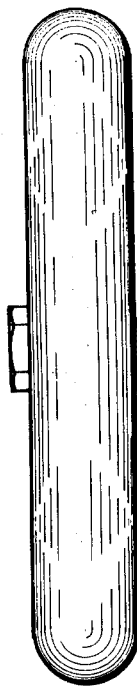
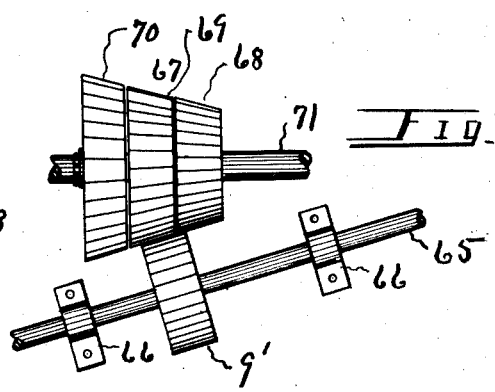
Witnesses
Arthur Sturges.
H. C. Compton
Inventor
Alfred N. Adams,
By Hiram A. Sturges.
Attorney

UNITED STATES PATENT OFFICE.

ALFRED N. ADAMS, OF OMAHA, NEBRASKA.

GEARING.

No. 926,919.  Specification of Letters Patent.  Patented July 6, 1909.

Application filed December 28, 1908. Serial No. 469,516.

*To all whom it may concern:*

Be it known that I, ALFRED N. ADAMS, a citizen of the United States, residing at Omaha, in the county of Douglas and State of Nebraska, have invented certain new and useful Improvements in Gearings, of which the following is a specification.

This invention relates to improvements in gearings, and has for its object the provision of a driving gear for use in connection with the driven gear of a swinging or sliding shaft or axle, and means for causing the rotatable movement, in either direction, of such driven gear by the continued rotation, in a single direction, of a driving shaft.

The invention includes a gear comprising a plurality of gear wheels, each of different diameters and different numbered cogs, these gear wheels being mounted end-to-end upon a shaft having stationary bearings, for use to drive a single gear, the shaft of which is pivotally mounted between its ends.

The herein described gearing may be applied to various uses, but is particularly of advantage in connection with vehicles, where forward and rearward movements are required, as well as movement upon curves.

The novel features of the invention are fully described herein and in the appended claims, and illustrated in the accompanying drawing, wherein,—

Figure 1 is a plan view of a vehicle frame with a gearing mounted thereon embodying my invention, the controlling rods for the slidable adjusting-keys, and for the steering devices being in section. Fig. 2 is a broken away plan or side view in section of a driven gear, and a driving gear, one of the gear wheels of the driving gear, the slidable adjusting-key and a part of the driving-shaft being in section. Fig. 3 is a plan or side view of a part of a driving-shaft and a slidable adjusting-key. Fig. 4 is an end view of one of the gear-wheels shown in Fig. 2, and showing a drum mounted therein, the shaft or axle being in section. Fig. 5 is a sectional view of the gear wheel shown in Fig. 4. Fig. 6 is a side view of a vehicle axle, with a vehicle wheel mounted thereon, the frame, bearings and the driven gear being in section. Fig. 7 is a plan or side view showing the newly invented gearing used in connection with a slidable shaft with gearing thereon, introduced to show a modified use of the invention.

Referring now to the drawing, which illustrates one of the uses to which the invention may be applied, numeral 1 indicates a rectangular vehicle frame, comprising side plates 2, and end plates 3.

Numerals 4 and 5 indicate the rear wheels, and at 6 and 7 are shown the front wheels of the vehicle, each of the wheels having a short axle 8 rigidly mounted thereon, and provided with a driven gear wheel 9 mounted upon its inner end, the axle having a pivotal mounting upon the side plate by means of bolt 10, whereby, under control of a driver or operator, the axles may be moved circularly on a horizontal plane to cause an operative movement of the wheels upon the arc of a circle, the center of such arc being the pivot or bolt 10, gear wheels 9 swinging, of course, in the opposite direction.

As a control for moving the wheels of the vehicle, as when describing curves, I have shown devices consisting of the pair of guide-arms 11 mounted upon the rear axles, and guide-arms 12 mounted upon the front axles. Each of guide arms 11 and 12 is provided at one of its ends with a sleeve or head 13 mounted upon the axle, within which the axle may rotate. Arms 11 and 12 are disposed substantially at right angles with the axles and they are parallel with the wheel tires.

At 14 is shown the bracing-rod having its ends secured to the inner terminals of arms 11, this rod being for the purpose of bearing the stresses, in a measure, which come upon arms 11.

At 15 is shown a bracing-rod having its ends secured to the inner terminals of arms 12, this rod being for the same purpose as rod 14, and constructed in all respects similar, except it is provided with the rack 16, in engagement with gear 17. Links 19 and 20 are employed, each having a front end pivotally mounted at 18 upon one of arms 12, these links being disposed to extend diagonally below the plane of power wheel 21, their opposite ends having pivotal mountings at 22 upon the ends of arms 11.

As thus described, a driver, by partly rotating operating-bar 23, secured to gear 17, as a steering means, may cause a swinging movement of all of the axles, and may cause a movement, in unison, of all of the vehicle wheels for turning curves, as is apparent.

I provide driving-shafts 24, 25, 26 and 27, suitably mounted upon the frame, by brackets 28 secured to side-plates 2, and having end-mountings in end-plates 3, at 29, as shown. The construction of these shafts is identical, as well as the gearings thereon mounted, but, as will be seen, since they are for the purpose of driving gears 9, upon axles 8, they vary in their rotatable movements. Upon the outer ends of these shafts are mounted driving gears 30, comprising a plurality of gear wheels indicated at 31, 32 and 33, wheel 33 having a greater diameter than wheel 32, and wheel 31 having a lesser diameter than wheel 32, and, as will be seen, the construction is such that when axles 8 have swinging movements, as when the vehicle is moving to describe a curve, gears 9 may engage any of gear wheels 31, 32 or 33, since they are mounted upon the orbital plane traversed by the driven gear 9, and it will be seen that, although these gear wheels have different numbers of cogs, the construction of these gear wheels is such that the cogs of gear 9 will mesh with any of them, without breaking or injuring the teeth or cogs of said gear-wheels.

Power wheel 21 is mounted upon shaft 34, this shaft having suitable bearings in side-plates 2, and provided with gears 35 adapted to mesh with gears 36, said gears 36 being mounted upon the inner ends of shafts 24, 25, 26 and 27. Wheel 21 may be actuated in any suitable manner, by any suitable force, and as will be seen by an inspection of Fig. 1, a rotation of this wheel in one direction will normally cause a rotation of all of the vehicle wheels to move the vehicle forwardly; and a reverse rotation of wheel 21, will cause a reverse rotation of the vehicle wheels to move the vehicle rearwardly.

Since the teeth or cogs of gear wheels 31, 32 and 33 must mesh with the cogs of gear 9, they are of uniform size, but since the diameters of the wheels of gears 30 differ as well as the numbers of their cogs, as compared with each other, and since the cogs of gear 9 may be in mesh with two of the gear wheels of gear 30 at the same time, means are employed whereby any wheel of gear 30 having a lesser diameter, may have a rotatable movement upon the shaft slightly greater than the adjacent gear wheel of greater diameter, and these means will be presently explained.

It has been mentioned that, during the swinging movement of axle 8, gear 9 may engage any of gears 31, 32 and 33, and since said gears are disposed closely adjacent, end-to-end, it is apparent that the engagement may be co-incident of gear 9 with two of the wheels of gear 30, as mentioned, and in order that the teeth of gear 9, during operation, will pass into engagement with any and all of the teeth of gear wheels 31, 32 and 33, gears 31 and 32 are formed with an annular recess 37. The teeth of these wheels are formed flaring, or longitudinally inclined, so that one end of each gear wheel has a less diameter than its opposite end; and annular recess 37 opens upon the ends of lesser diameter of wheels 31 and 32, and within each recess 37 is seated a circular drum 38. Each drum 38 is formed with a recess 39 opening upon one of its ends, a part of its periphery, and opening upon the shaft aperture 40.

While gear wheels 31 and 32 and the drums therein are seated upon the shaft, they are not secured thereon, but certain locking means are employed whereby each drum may be secured to the shaft, these means comprising the rock-lever 41 seated in recess 39 and pivotally mounted by bolt 42. Lever 41 has arms 43 and 44 pivotally mounted at 45 upon the body of the lever, and resiliently actuated by springs 46. The drums are also secured to the shaft by means of holding-bars 72 seated in radial apertures 73 of the drums and extended to seatings within the shaft.

Lever 41 is provided with a projection or index 47 extending transversely from its lower end to a seating within one of slots 48, said slots 48 being formed to extend diagonally in the sildable adjusting key 49, this adjusting key being seated in the longitudinal slot 50 of each of driving-shafts 24, 25, 26 and 27. Upon the transverse wall 51 of recess 37 of gear-wheels 31 and 32 are formed a series of recesses 52 which extend outwardly of recess 37 to form projections or lugs 53, and within recesses 52 may be seated the resiliently actuated arm 43; and I provide a series of recesses 54, extending outwardly of said recess 37 to form projections or lugs 55, and within any of recesses 54 may be seated arm 44.

On account of the operation of springs 46, arms 43 and 44 are forced outwardly of the drum to cause the terminals of said arms to pass within recesses 52 and 54. It is apparent, however, by an inspection of Fig. 4, that while arm 43 is seated within recess 52 the gear may rotate upon the drum in a direction indicated by the arrow, and a rotation in an opposite direction of said gear would be prevented, since the extended arm 43 would engage lug 53, being forced to that position by its spring; and likewise, if arm 44 was seated within recess 54, it is obvious that the gear could be rotated upon the drum in a direction opposite to that indicated by the arrow, and a reverse rotation would be prevented, since it would be held by lug 55.

Each of gear-wheels 31 and 32 is provided with drums of identical construction. Gear 33, however, has no drum, and may be rigidly secured upon the shaft.

A controlling means is provided for each of adjusting keys 49, whereby they may have slidable movements in unison, longitudinally upon driving shafts 24, 25, 26 and 27, said means comprising links 56 disposed transversely near the ends of frame 1 and having terminal collars or clips 57 inclosing said shafts, these collars being seated between projections or lugs 59 upon the outer ends of keys 49. I provide links 60 and 61 disposed longitudinally of frame 1, each having an end mounting 62 upon one of the transverse links 56, their opposite ends being mounted upon the ends of rock-bar 63. This rock-bar is provided with the upwardly-extending operating rod 64, and by an inspection of Fig. 1 it will be seen that the driver or operator by partly rotating rod 64, may cause an outward movement, in unison, of all of keys 49; and by rotating operating-rod 64 in the opposite direction, keys 49 may be moved inwardly of the shafts upon which they are mounted.

Slots 48 are formed to extend diagonally with reference to the longitudinal bodies of keys 49, and when these keys are moved inwardly, indexes 47 of rock-levers 41 will be moved or swung sidewise, thereby causing arm 44 to be withdrawn or to move inwardly of the drum, and arm 43, by reason of its spring 46 will move outwardly of recess 39 and will enter recess 52 of the gear. And when operating rod 64 is rotated in an opposite direction, adjusting keys 49 will be drawn outwardly of the driving shafts, and thereby will cause indexes 47 to be swung oppositely, and arms 43 will thereby be withdrawn from recesses 52, and arms 44 will enter recesses 54.

The control just described is employed only for engagement of arms 43 or 44 within recesses 52 and 54 at the time a reverse movement is desired of the vehicle, when "backing" the vehicle or for moving forwardly. For moving the vehicle forwardly, arms 44 are caused to enter recesses 54 of gears 31 and 32 and are sustained by lugs 55, said gears thereby being connected with the drums. If, at this time, the cogs of gear 9 are engaging the cogs of both of gears 31 and 32, it will be seen that the revoluble movement of the driven gear 9 is caused by gear 32 of greater diameter, gear 31, at this time, not imparting any force. At this time, while gear 31 moves upon its shaft in the same direction as gear 32, it has a movement somewhat greater than gear 32, since it has a less number of teeth. At this time, arm 43 is drawn within recess 39, and gear 31 may, therefore, move faster than the drum upon which it is mounted. As soon as the cogs of gear 9 pass from engagement of gear 32 and engages gear 31, arm 44 will engage one of lugs 55 within a recess 54, since the force for driving gear 9 is sustained by said gear 31.

The construction of gears 30 is of advantage for use in connection with vehicles since, at the time of moving the vehicle upon curves, the swinging movement of each wheel-axle, at the outer side of the vehicle is in engagement with a gear of greatest diameter of the series of gears 30, the gears of lesser diameter at the inner side of the vehicle being engaged by gears 9. Also, by use of this construction, power may be applied to all of the axles, and the frictional tread or engagement of each wheel upon the ground, may be utilized by the driving power. It is apparent that the number of driving wheels in gears 30 is not limited to three, but any larger number may be employed, as desired.

While the invention has been described in connection with a gear upon an axle having a swinging movement from a pivotal support, it is apparent that the operation of gears 30 would be the same where a driven shaft is employed which is longitudinally slidable, the driven gear engaging the several gear-wheels, as illustrated in Fig. 7, while sliding within a stationary support, and this construction would not be considered a departure from the scope of the invention, since it is not important in what manner the driven gear is moved or presented to the plurality of driving gears 30. In Fig. 7, gear 9' is mounted upon shaft 65 longitudinally slidable in brackets 66, to cause its gear to be presented to gear 67 comprising a plurality of gear wheels 68, 69 and 70 upon shaft 71, identical in construction to gear 30 and shaft 25 already described. In this last mentioned construction, shaft 65 is disposed parallel with the conical wall described by the cogs of the several assembled gear wheels 68, 69 and 70, and shafts 65 and 71 are disposed in angular relation with reference to each other. This construction is useful for many purposes, and requires no change in any of the gears. It simply relates to the manner of presenting gear 9 and 9'. In the first instance this presentation is upon a swinging axle or shaft, and in the last instance it is upon a slidable shaft.

Having fully described my invention, what I claim and desire to secure by Letters Patent is,—

1. In a gearing, the combination with a vehicle having pivotally mounted axles each having an axle-gear and a vehicle-wheel rigidly mounted upon its respective ends, of driving gears each comprising a plurality of gear wheels of greater and lesser diameters disposed end-to-end upon their respective shafts and adapted to be in engagement with an axle-gear during the pivotal movement of its axle; means within the gear wheels of each driving gear and shaft thereof whereby a gear wheel of lesser diameter may have a greater rotatable speed than an adjacent gear wheel of greater diameter while said axle gears are in engagement with the gear wheels of each of said driving gears.

2. In combination, a gearing comprising a plurality of recessed bevel gears of greater and of lesser diameters disposed separately end-to-end upon a driving shaft; a driven pinion mounted upon a shaft, said shaft being movable to present said pinion to each of said bevel gears; a recessed drum within each recess of the bevel gears; means within the recess of each drum and upon the driving shaft for allowing a greater degree of revoluble speed of a bevel gear of lesser diameter than the revoluble speed of an adjacent bevel gear of greater diameter while said bevel gears are in engagement with the driven pinion.

3. In combination with a driven gear, a gearing as described, comprising a bevel gear of greater diameter; a plurality of recessed bevel gears of lesser diameters; said bevel gears disposed end-to-end upon a driving shaft, said bevel gear of greater diameter being rigidly secured upon said shaft; a recessed drum seated in each recess of said lesser bevel gears and having a rigid connection with the shaft; means within the recess of each drum and upon the driving shaft for allowing a greater degree of revoluble speed of a bevel gear of lesser diameter than the revoluble speed of an adjacent bevel gear of greater diameter while said bevel gears are in engagement with the driven gear.

In testimony whereof I affix my signature in presence of two witnesses.

ALFRED N. ADAMS.

Witnesses:
  HIRAM A. STURGES,
  ALFRED ADAMS.